United States Patent
Matsushita (10) Patent No.: US 8,583,337 B2
(45) Date of Patent: Nov. 12, 2013

(54) BRAKE DEVICE FOR VEHICLE

(75) Inventor: Satoshi Matsushita, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 282 days.

(21) Appl. No.: 13/129,420

(22) PCT Filed: Nov. 11, 2009

(86) PCT No.: PCT/JP2009/069169
§ 371 (c)(1), (2), (4) Date: May 16, 2011

(87) PCT Pub. No.: WO2010/064526
PCT Pub. Date: Jun. 10, 2010

(65) Prior Publication Data
US 2011/0224881 A1  Sep. 15, 2011

(30) Foreign Application Priority Data
Dec. 5, 2008 (JP) ................. 2008-310949

(51) Int. Cl.
*B60T 8/17* (2006.01)
*G06F 19/00* (2011.01)

(52) U.S. Cl.
USPC .......... 701/70; 701/78; 701/83; 303/191

(58) Field of Classification Search
USPC ...... 701/70, 75, 78, 81, 83, 89; 303/20, 191, 303/163, 119.1
See application file for complete search history.

(56) References Cited

U.S. PATENT DOCUMENTS

| | | | |
|---|---|---|---|
| 2002/0180262 A1* | 12/2002 | Hara et al. | 303/119.1 |
| 2008/0231109 A1 | 9/2008 | Yamada et al. | |
| 2008/0255744 A1* | 10/2008 | Yasui et al. | 701/70 |
| 2009/0001807 A1* | 1/2009 | Nomura et al. | 303/20 |

FOREIGN PATENT DOCUMENTS

| | | |
|---|---|---|
| CN | 101254784 | 9/2008 |
| DE | 102005024577 | 11/2006 |
| EP | 1953053 | 8/2008 |
| JP | 2008-126695 | 6/2008 |
| JP | 2008-137654 | 6/2008 |
| JP | 2008-174005 | 7/2008 |
| JP | 2008-184057 | 8/2008 |
| JP | 2009-137377 | 6/2009 |

OTHER PUBLICATIONS

Chinese Office Action, dated Mar. 25, 2013, 6 pages.

* cited by examiner

*Primary Examiner* — Tan Q Nguyen
(74) *Attorney, Agent, or Firm* — Rankin, Hill & Clark LLP (57) ABSTRACT

A brake device for a vehicle is provided in which a slave cylinder stroke-target motor rotational angle conversion means (M4) converts a target stroke for a slave cylinder into a target rotational angle for an electric motor, and a target electric motor control means (M5) carries out rotational angle feedback control of operation of an electric motor in order to make an actual rotational angle of the electric motor detected by an actual rotation angle sensor (Sd) converge to a target rotation angle. In this process, since a communication means (M7) formed of CAN transmits an actual brake fluid pressure detected by a fluid pressure sensor (Sb) at predetermined time intervals, and correction means (M6, M3) corrects the target rotation angle for the electric motor (the target stroke for the slave cylinder) based on a difference or a ratio of the actual brake fluid pressure and the target brake fluid pressure that is transmitted by the communication means (M7), it is possible to make the slave cylinder generate brake fluid pressure according to the driver braking operation state without being influenced by individual differences of the slave cylinder, change over time of the slave cylinder, or environmental conditions such as temperature.

8 Claims, 7 Drawing Sheets

BRAKE DEVICE FOR VEHICLE

TECHNICAL FIELD

The present invention relates to a brake device for a vehicle, comprising electric brake fluid pressure generation means for generating brake fluid pressure by an electric motor.

BACKGROUND ART

In an arrangement of a so-called BBW type brake device that converts an amount of operation (or an operating force) of a brake pedal operated by a driver into an electric signal, actuates a slave cylinder having an electric motor based on the electric signal, and actuates a wheel cylinder by brake fluid pressure generated by the slave cylinder, the arrangement including between the slave cylinder and the wheel cylinder an ABS device that can reduce, hold, and increase the brake fluid pressure to be transmitted to the wheel cylinder, is known from Patent Document 1 below.
Patent Document 1: Japanese Patent Application Laid-open No. 2008-174005

DISCLOSURE OF INVENTION

Problems to be Solved by the Invention

The above-mentioned conventional arrangement includes a fluid pressure sensor that detects brake fluid pressure generated by a master cylinder and a fluid pressure sensor that detects brake fluid pressure generated by the slave cylinder, and the electric motor of the slave cylinder carries out fluid pressure feedback control so that the brake fluid pressure generated by the slave cylinder coincides with a target brake fluid pressure corresponding to the brake fluid pressure generated by the master cylinder.

When as described above the electric motor of the slave cylinder is subjected to fluid pressure feedback control, since both the fluid pressure sensor of the master cylinder and the fluid pressure sensor of the slave cylinder are required, there is the problem that this causes an increase in the number of components and an increase in the cost. Setting a target rotational angle for the electric motor of the slave cylinder according to the amount of operation (or the operating force) of the brake pedal by the driver and subjecting the electric motor to rotational angle feedback control so that the actual rotational angle of the electric motor coincides with the target rotational angle might therefore be considered.

However, when such rotational angle feedback control of the electric motor is employed, if the relationship between the stroke of a piston of the slave cylinder and the brake fluid pressure generated by the slave cylinder changes depending on individual differences of the slave cylinder, change over time of the slave cylinder, or environmental conditions such as temperature, the relationship between the amount of operation (or the operating force) of the brake pedal and vehicle body deceleration changes, and there is a possibility of the driver being given an uncomfortable sensation.

The present invention has been accomplished in light of the above-mentioned circumstances, and it is an object thereof to make electric brake fluid pressure generation means generate a target brake fluid pressure without carrying out fluid pressure feedback control.

Means for Solving the Problems

In order to attain the above object, according to a first aspect of the present invention, there is provided a brake device for a vehicle, comprising: electric brake fluid pressure generation means for generating brake fluid pressure by an electric motor; actual brake fluid pressure detection means for detecting an actual brake fluid pressure actually generated by the electric brake fluid pressure generation means; braking operation state detection means for detecting a driver braking operation state; target brake fluid pressure setting means for setting a target brake fluid pressure that is to be generated by the electric brake fluid pressure generation means according to the braking operation state; target rotational angle setting means for setting a target rotational angle for the electric motor that corresponds to the target brake fluid pressure; actual rotational angle detection means for detecting an actual rotational angle of the electric motor; electric motor control means for controlling actuation of the electric motor so as to make the actual rotational angle converge to the target rotational angle; communication means for transmitting at predetermined time intervals an actual brake fluid pressure detected by the actual brake fluid pressure detection means; and correction means for correcting the target rotational angle for the electric motor based on a difference or a ratio of the target brake fluid pressure and the actual brake fluid pressure that is transmitted by the communication means.

Further, according to a second aspect of the present invention, in addition to the first aspect, the correction means determines a calculation timing for a corrected value based on the braking operation state detected by the braking operation state detection means or an actual brake fluid pressure signal detected by the actual brake fluid pressure detection means.

Furthermore, according to a third aspect of the present invention, in addition to the first aspect, the correction means cancels calculation of a corrected value when the braking operation state detection means detects a return operation of a brake pedal.

Moreover, according to a fourth aspect of the present invention, in addition to the first aspect, the correction means determines the timing of incorporation of the corrected value based on the braking operation state detected by the braking operation state detection means or an actual brake fluid pressure signal detected by the actual brake fluid pressure detection means.

Further, according to a fifth aspect of the present invention, in addition to any one of the first to fourth aspects, the correction means comprises a gain map corresponding to a target brake fluid pressure and calculates a corrected value based on the target brake fluid pressure and a difference or a ratio of the actual brake fluid pressure and the target brake fluid pressure.

A slave cylinder 23 of an embodiment corresponds to the electric brake fluid pressure generation means of the present invention, pedal stroke-target brake fluid pressure conversion means M1 of the embodiment corresponds to the target brake fluid pressure setting means of the present invention, target brake fluid pressure-slave cylinder stroke conversion means M2 and slave cylinder stroke-target motor rotational angle conversion means M4 of the embodiment correspond to the target rotational angle setting means of the present invention, correction gain multiplication means M3, correction gain calculation means M6, and target brake fluid pressure-correction gain setting means M8 of the embodiment correspond to the correction means of the present invention, a CAN M7 of the embodiment corresponds to the communication means of the present invention, a pedal stroke sensor Sa of the embodiment corresponds to the braking operation state detection means of the present invention, a fluid pressure sensor Sb of the embodiment corresponds to the actual brake fluid pressure detection means of the present invention, and a motor rotational angle sensor Sd of the embodiment corresponds to the actual rotational angle detection means of the present invention.

Effects of the Invention

In accordance with the first aspect of the present invention, when the braking operation state detection means detects a driver braking operation state, the target brake fluid pressure setting means sets the target brake fluid pressure that is to be generated by the electric brake fluid pressure generation means according to the driver braking operation state, and the target rotational angle setting means sets the target rotational angle for the electric motor corresponding to the target brake fluid pressure. The electric motor control means carries out rotational angle feedback control of actuation of the electric motor so as to make the actual rotational angle of the electric motor detected by the actual rotational angle detection means converge to the target rotational angle. In this process, since the communication means transmits the actual brake fluid pressure detected by the actual brake fluid pressure detection means at predetermined time intervals, and the correction means corrects the target rotational angle for the electric motor based on the difference or ratio of the target brake fluid pressure and the actual brake fluid pressure transmitted by the communication means, it is possible to make the electric brake fluid pressure generation means generate brake fluid pressure according to the driver braking operation state without being influenced by individual differences of the electric brake fluid pressure generation means, change over time of the electric brake fluid pressure generation means, or environmental conditions such as temperature. Moreover, since the actuation of the electric motor is not subjected to fluid pressure feedback control, it is sufficient if the actual brake fluid pressure detected by the actual brake fluid pressure detection means is obtained at predetermined time intervals, it is not necessary to employ exclusive actual brake fluid pressure detection means, and it is possible to reduce the number of components and the cost.

Furthermore, in accordance with the second aspect of the present invention, since the correction means determines the calculation timing for the corrected value based on the braking operation state detected by the braking operation state detection means or the actual brake fluid pressure signal detected by the actual brake fluid pressure detection means, it is possible to prevent calculation of an inappropriate corrected value from being carried out in a state in which the brake fluid pressure is unstable or a state in which an actual brake fluid pressure signal is not inputted.

Moreover, in accordance with the third aspect of the present invention, since the correction means cancels calculation of the corrected value when the braking operation state detection means detects a return operation of the brake pedal, even if the relationship between the stroke of the electric brake fluid pressure generation means and the brake fluid pressure generated thereby changes due to the influence of hysteresis accompanying the return operation of the brake pedal, it is possible to prevent calculation of an inappropriate corrected value from being carried out.

Furthermore, in accordance with the fourth aspect of the present invention, since the correction means determines the timing of incorporation of the corrected value based on the braking operation state detected by the braking operation state detection means or the actual brake fluid pressure signal detected by the actual brake fluid pressure detection means, it is possible to prevent the driver from being given an uncomfortable sensation due to a rapid increase or a rapid decrease of the braking force caused by rapid change in the target motor rotational angle due to incorporation of the corrected value being carried out during braking.

Moreover, in accordance with the fifth aspect of the present invention, since the correction means includes the gain map corresponding to the target brake fluid pressure, and the corrected value is calculated based on the target brake fluid pressure and the difference or ratio between the actual brake fluid pressure and the target brake fluid pressure, it is possible to enhance the coincidence of the actual brake fluid pressure with the target brake fluid pressure in all target brake fluid pressure regions.

EXPLANATION OF REFERENCE NUMERALS AND SYMBOLS 23 slave cylinder (electric brake fluid pressure generator)
31 electric motor
M1 pedal stroke—target brake fluid pressure converter (target brake fluid pressure establishing means)
M2 target brake fluid pressure—slave cylinder stroke converter (target rotation angle establishing means)
M3 correct gain multiplier (correction means)
M4 slave cylinder stroke—target motor rotation angle converter (target rotation angle establishing means)
M5 electric motor controller
M6 correct gain calculator (correction means)
M7 CAN (communication means)
M8 target brake fluid pressure—correct gain establishing means (correction means)
S a pedal stroke sensor (braking operational condition detector)
Sb fluid pressure sensor (actual brake fluid pressure detector)
Sd motor rotation angle sensor (actual rotation angle detector)

BEST MODE FOR CARRYING OUT THE INVENTION

Modes for carrying out the present invention are explained below by reference to the attached drawings.

First Embodiment

FIG. 1 to FIG. 6 show a first embodiment of the present invention.

Figure 1:
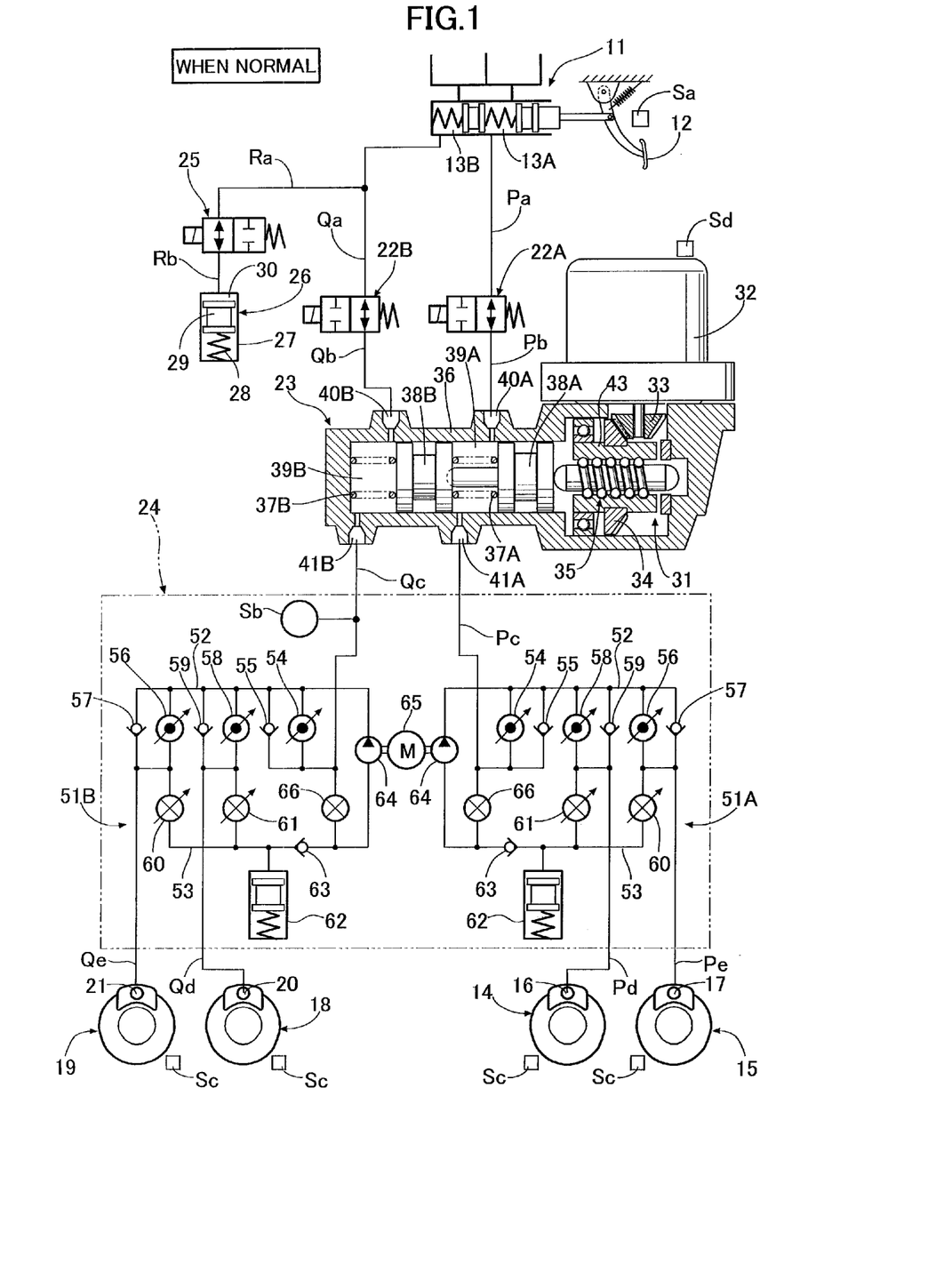
FIG. 1 is a fluid-pressure circuit diagram of a vehicle brake system when the vehicle is operating under normal conditions. (first embodiment)

As shown in FIG. 1, a tandem type master cylinder 11 includes two fluid pressure chambers 13A and 13B that output a brake fluid pressure corresponding to a pedal stroke by a driver depressing a brake pedal 12, one of the fluid pressure chambers 13A is connected to wheel cylinders 16 and 17 of disk brake devices 14 and 15 of for example a left front wheel and a right rear wheel via fluid paths Pa, Pb, Pc, Pd, and Pe (first system), and the other of the fluid pressure chambers 13B is connected to wheel cylinders 20 and 21 of disk brake devices 18 and 19 of for example a right front wheel and a left rear wheel via fluid paths Qa, Qb, Qc, Qd, and Qe (second system).

A cut-off valve 22A, which is a normally open electromagnetic valve, is disposed between the fluid paths Pa and Pb, a cut-off valve 22B, which is a normally open electromagnetic valve, is disposed between the fluid paths Qa and Qb, a slave cylinder 23 is disposed between the fluid paths Pb and Qb and the fluid paths Pc and Qc, and a VSA (vehicle stability assist) device 24 is disposed between the fluid paths Pc and Qc and the fluid paths Pd and Pe; Qd and Qe.

A stroke simulator 26 is connected to fluid paths Ra and Rb branching from the fluid path Qa via a reaction force allowing valve 25, which is a normally closed electromagnetic valve. The stroke simulator 26 is one in which a piston 29 urged by means of a spring 28 is slidably fitted into a cylinder 27, and a fluid pressure chamber 30 formed on the opposite side of the piston 29 to the spring 28 communicates with the fluid path Rb.

An actuator 31 of the slave cylinder 23 includes an electric motor 32, a drive bevel gear 33 provided on an output shaft thereof, a driven bevel gear 34 meshing with the drive bevel gear 33, and a ball screw mechanism 35 that is operated by the driven bevel gear 34.

A rear piston 38A and a front piston 38B urged in the retreat direction by return springs 37A and 37B respectively are slidably disposed in a rear part and a front part of a cylinder main body 36 of the slave cylinder 23, and a rear fluid pressure chamber 39A and a front fluid pressure chamber 39B are defined in front of the rear piston 38A and the front piston 38B respectively.

The rear fluid pressure chamber 39A communicates with the fluid path Pb via a rear input port 40A and communicates with the fluid path Pc via a rear output port 41A, and the front fluid pressure chamber 39B communicates with the fluid path Qb via a front input port 40B and communicates with the fluid path Qc via a front output port 41B.

In FIG. 1, when the electric motor 32 is driven in one direction, the rear and front pistons 38A and 38B move forward via the drive bevel gear 33, the driven bevel gear 34, and the ball screw mechanism 35, and at the moment when the rear and front input ports 40A and 40B communicating with the fluid paths Pb and Qb are closed a brake fluid pressure is generated in the rear and front fluid pressure chambers 39A and 39B, thus enabling the brake fluid pressure to be outputted to the fluid paths Pc and Qc via the rear and front output ports 41A and 41B.

The structure of the VSA device 24 is known and employs the same structure for a first brake actuator 51A for controlling the first system of the disk brake devices 14 and 15 for the left front wheel and the right rear wheel and a second brake actuator 51B for controlling the second system of the disk brake devices 18 and 19 for the right front wheel and the left rear wheel.

The first brake actuator 51A for the first system of the disk brake devices 14 and 15 for the left front wheel and the right rear wheel is explained below as being representative thereof.

The first brake actuator 51A is disposed between the fluid path Pc communicating with the rear output port 41A of the slave cylinder 23 positioned on the upstream side and the fluid paths Pd and Pe communicating respectively with the wheel cylinders 16 and 17 of the left front wheel and the right rear wheel positioned on the downstream side.

The first brake actuator 51A includes a fluid path 52 and a fluid path 53 in common for the wheel cylinders 16 and 17 of the left front wheel and the right rear wheel, and includes a regulator valve 54, which is a normally open electromagnetic valve with a variable degree of opening, disposed between the fluid path Pc and the fluid path 52, a check valve 55 disposed in parallel to the regulator valve 54 and allowing flow of brake fluid from the fluid path Pc side to the fluid path 52 side, an in-valve 56, which is a normally open electromagnetic valve with a variable degree of opening, disposed between the fluid path 52 and the fluid path Pe, a check valve 57 disposed in parallel to the in-valve 56 and allowing flow of brake fluid from the fluid path Pe side to the fluid path 52 side, an in-valve 58, which is a normally open electromagnetic valve with a variable degree of opening, disposed between the fluid path 52 and the fluid path Pd, a check valve 59 disposed in parallel to the in-valve 58 and allowing flow of brake fluid from the fluid path Pd side to the fluid path 52 side, an out-valve 60, which is a normally closed electromagnetic valve with a variable degree of opening, disposed between the fluid path Pe and the fluid path 53, an out-valve 61, which is a normally closed electromagnetic valve with a variable degree of opening, disposed between the fluid path Pd and the fluid path 53, a reservoir 62 connected to the fluid path 53, a check valve 63 provided between the fluid path 53 and the fluid path 52 and allowing flow of brake fluid from the fluid path 53 side to the fluid path 52 side, a pump 64 disposed between the check valve 63 and the fluid path 52 and supplying brake fluid from the fluid path 53 side to the fluid path 52 side, an electric motor 65 for driving the pump 64, and a suction valve 66, which is a normally closed electromagnetic valve, disposed between the fluid path Pc and an intermediate position between the check valve 63 and the pump 64.

The electric motor 65 is shared by the pumps 64 and 64 of the first and second brake actuators 51A and 51B, but it is also possible to provide electric motors 65 and 65 exclusively used for the pumps 64 and 64 respectively.

A pedal stroke sensor Sa for detecting a pedal stroke, which is the amount of a braking operation of a driver, is provided on the brake pedal 12, a fluid pressure sensor Sb for detecting a brake fluid pressure generated by the slave cylinder 23 is provided in the fluid path Qc on the entrance side of the other VSA device 24, wheel speed sensors Sc are provided on the four wheels respectively, and a motor rotational angle sensor Sd for detecting a rotational angle of the electric motor 32 is provided on the slave cylinder 23.

Figure 3:
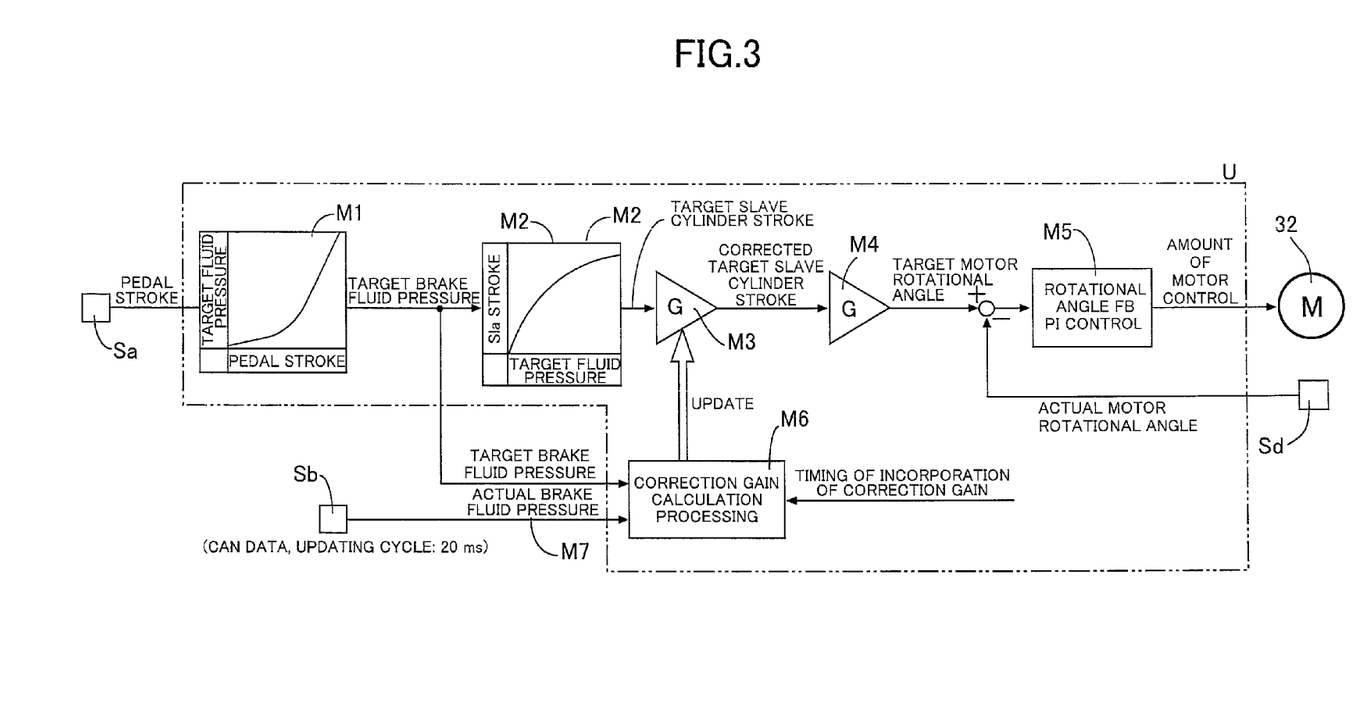
FIG. 3 is a block diagram of a control system of an electric motor. (first embodiment)

As shown in FIG. 3, an electronic control unit U includes pedal stroke-target brake fluid pressure conversion means M1, target brake fluid pressure-slave cylinder stroke conversion means M2, correction gain multiplication means M3, slave cylinder stroke-target motor rotational angle conversion means M4, electric motor control means M5, and correction gain calculation means M6.

The pedal stroke-target brake fluid pressure conversion means M1 converts a pedal stroke of the brake pedal 12 detected by the pedal stroke sensor Sa into a target brake fluid pressure that is to be generated by the slave cylinder 23.

The target brake fluid pressure-slave cylinder stroke conversion means M2 converts the target brake fluid pressure outputted by the pedal stroke-target brake fluid pressure conversion means M1 into a target stroke for the slave cylinder 23.

The correction gain multiplication means M3 carries out correction by multiplying the target stroke for the slave cylinder 23, outputted by the target brake fluid pressure-slave cylinder stroke conversion means M2, by a correction gain, which is described later.

The slave cylinder stroke-target motor rotational angle conversion means M4 converts the target stroke for the slave cylinder 23 after multiplication by the correction gain by the correction gain multiplication means M3 into a target rotational angle for the electric motor 32 of the slave cylinder 23.

Inputted into the electric motor control means M5 are the target rotational angle for the electric motor 32 that is outputted by the slave cylinder stroke-target motor rotational angle conversion means M4, and a deviation from the actual rotational angle of the electric motor 32 detected by the motor rotational angle sensor Sd, the electric motor control means M5 carrying out rotational angle feedback control of driving of the electric motor 32 in order to make the deviation converge to zero.

Inputted into the correction gain calculation means M6 are an actual brake fluid pressure detected by the fluid pressure sensor Sb of the VSA device 24 and the target brake fluid pressure outputted by the pedal stroke-target brake fluid pressure conversion means M1. The actual brake fluid pressure is inputted into the correction gain calculation means M6 via a CAN (Controller Area Network) M7 at a predetermined cycle (e.g. 20 msec). The correction gain calculation means M6 calculates a deviation between the actual brake fluid pressure and the target brake fluid pressure at the predetermined cycle, and calculates a correction gain Grg according to the deviation.

The target stroke for the slave cylinder 23 is multiplied by the correction gain Grg in the correction gain multiplication means M3.

The operation of the first embodiment of the present invention having the above-mentioned arrangement is now explained.

When the situation is normal and the system functions normally, as shown in FIG. 1 the cut-off valves 22A and 22B, which are normally open electromagnetic valves, are de-energized and opened, and the reaction force allowing valve 25, which is a normally closed electromagnetic valve, is energized and opened. In this state, if the pedal stroke sensor Sa detects depression of the brake pedal 12 by the driver, the electric motor 32 of the slave cylinder 23 actuates, the rear and front pistons 38A and 38B move forward, and a brake fluid pressure is therefore generated in the rear and front fluid pressure chambers 39A and 39B. This brake fluid pressure is transmitted to the wheel cylinders 16 and 17; 20 and 21 of the disk brake devices 14 and 15; 18 and 19 via the opened in-valves 56 and 56; 58 and 58 of the VSA device 24, thus braking the wheels.

If the rear and front pistons 38A and 38B of the slave cylinder 23 move slightly forward, since communication between the fluid paths Pb and Qb and the rear and front fluid pressure chambers 39A and 39B is cut off, a brake fluid pressure generated by the master cylinder 11 is not transmitted to the disk brake devices 14 and 15; 18 and 19. In this process, a brake fluid pressure generated by the other fluid pressure chamber 13B of the master cylinder 11 is transmitted to the fluid pressure chamber 30 of the stroke simulator 26 via the opened reaction force allowing valve 25, and moving the piston 29 against the spring 28 permits stroke of the brake pedal 12 and generates a simulated pedal reaction force, thus eliminating any disagreeable sensation for the driver.

As shown in FIG. 3, the pedal stroke-target brake fluid pressure conversion means M1 converts the pedal stroke of the brake pedal 12 into the target brake fluid pressure that is to be generated by the slave cylinder 23, the target brake fluid pressure-slave cylinder stroke conversion means M2 converts the target brake fluid pressure into the target stroke for the slave cylinder 23, and the slave cylinder stroke-target motor rotational angle conversion means M4 converts the target stroke of the slave cylinder 23 into the target rotational angle for the electric motor 32 of the slave cylinder 23. The electric motor control means M5, into which a deviation between the target rotational angle for the electric motor 32 and the actual rotational angle of the electric motor 32 detected by the motor rotational angle sensor Sd is inputted, carries out rotational angle feedback control of driving of the electric motor 32 so as to make the deviation converge to zero.

In this process, the actual brake fluid pressure detected by the fluid pressure sensor Sb contained in the VSA device 24 is inputted into the correction gain calculation means M6 via the CAN M7 at a cycle of 20 msec, and the target brake fluid pressure outputted by the pedal stroke-target brake fluid pressure conversion means M1 is inputted continuously into the correction gain calculation means M6. The correction gain calculation means M6 calculates a deviation S (target brake fluid pressure—actual brake fluid pressure) between an actual brake fluid pressure AP and a target brake fluid pressure TP at the predetermined cycle (see FIG. 4 (A)) and calculates a correction gain Grg according to the deviation S, and the correction gain multiplication means M3 multiplies the target stroke for the slave cylinder 23 by the correction gain Grg.

Figure 4:
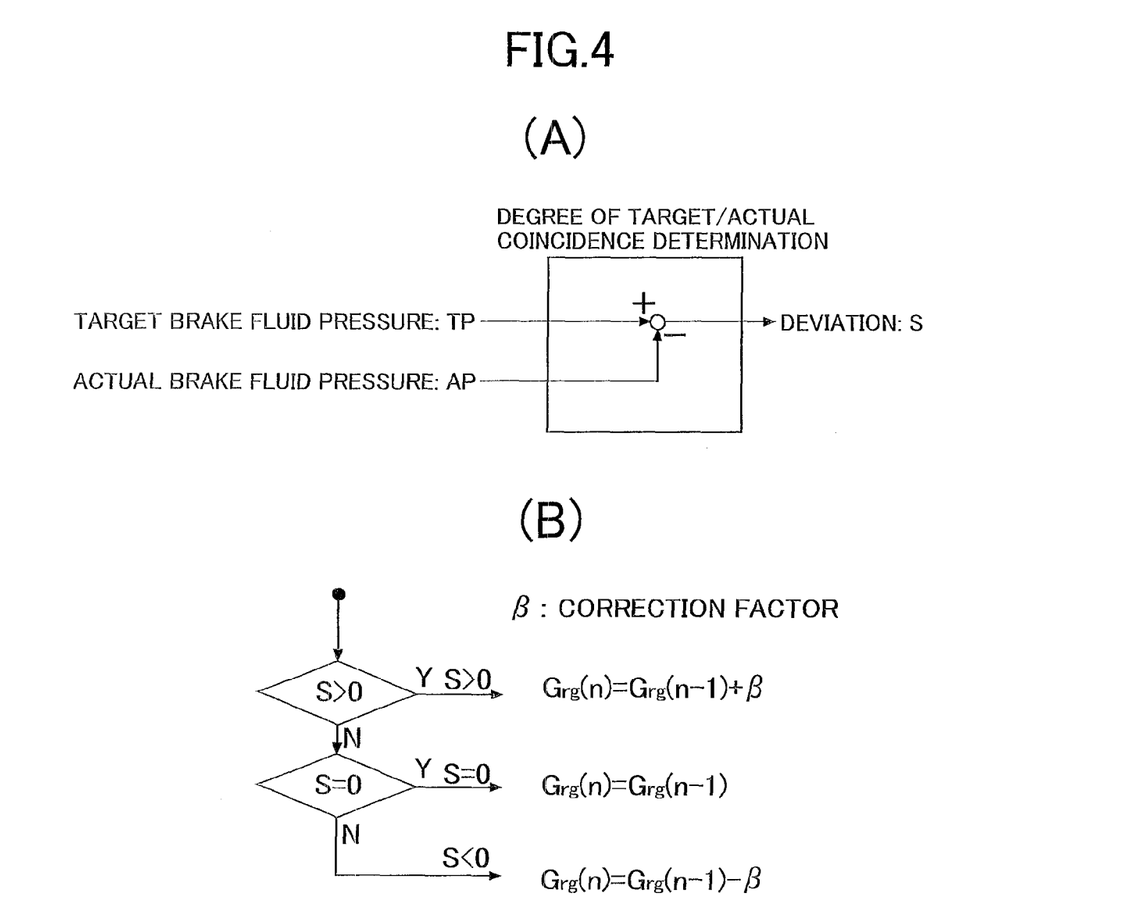
FIG. 4 is a diagram (part 1) for explaining a calculation technique of a correction gain. (first embodiment)

As shown in FIG. 4 (B), when the deviation S between the actual brake fluid pressure AP and the target brake fluid pressure TP is greater than 0, a current value Grg(n) for the correction gain Grg is calculated by adding a correction factor β to a previous value Grg(n−1); when the deviation S between the actual brake fluid pressure AP and the target brake fluid pressure TP is 0, the current value Grg(n) for the correction gain Grg is calculated as the same value as the previous value Grg(n−1); and when the deviation S between the actual brake fluid pressure AP and the target brake fluid pressure TP is smaller than 0, the current value Grg(n) for the correction gain Grg is calculated by subtracting the correction factor β from the previous value Grg(n−1).

The correction gain multiplication means M3 carries out correction by multiplying the target stroke for the slave cylinder 23 outputted by the target brake fluid pressure-slave cylinder stroke conversion means M2 by the correction gain Grg.

As described above, since the target stroke for the slave cylinder 23 outputted by the target brake fluid pressure-slave cylinder stroke conversion means M2 is corrected using the correction gain Grg calculated based on the deviation S between the actual brake fluid pressure AP and the target brake fluid pressure TP, a brake fluid pressure corresponding to the driver braking operation state can be generated in the slave cylinder 23 regardless of individual differences of the slave cylinder 23, change over time of the slave cylinder 23, or environmental conditions such as temperature only by carrying out rotational angle feedback control but without carrying out fluid pressure feedback control of the electric motor 32.

Since the fluid pressure sensor Sb already exists in the VSA device 24 and its original purpose is to confirm the operational state of the VSA device 24, the actual brake fluid pressure detected by the fluid pressure sensor Sb is inputted into the electronic control unit U via the CAN M7 only at a cycle of 20 msec, and fluid pressure feedback control of the electric motor 32 of the slave cylinder 23 cannot be carried out using the brake fluid pressure. However, using the brake fluid pressure for calculation of the correction gain Grg for correcting the target motor rotational speed enables the precision of control to be sufficiently enhanced while carrying out rotational angle feedback control of the electric motor 32.

Another calculation method for the correction gain Grg is now explained.

Figure 5:
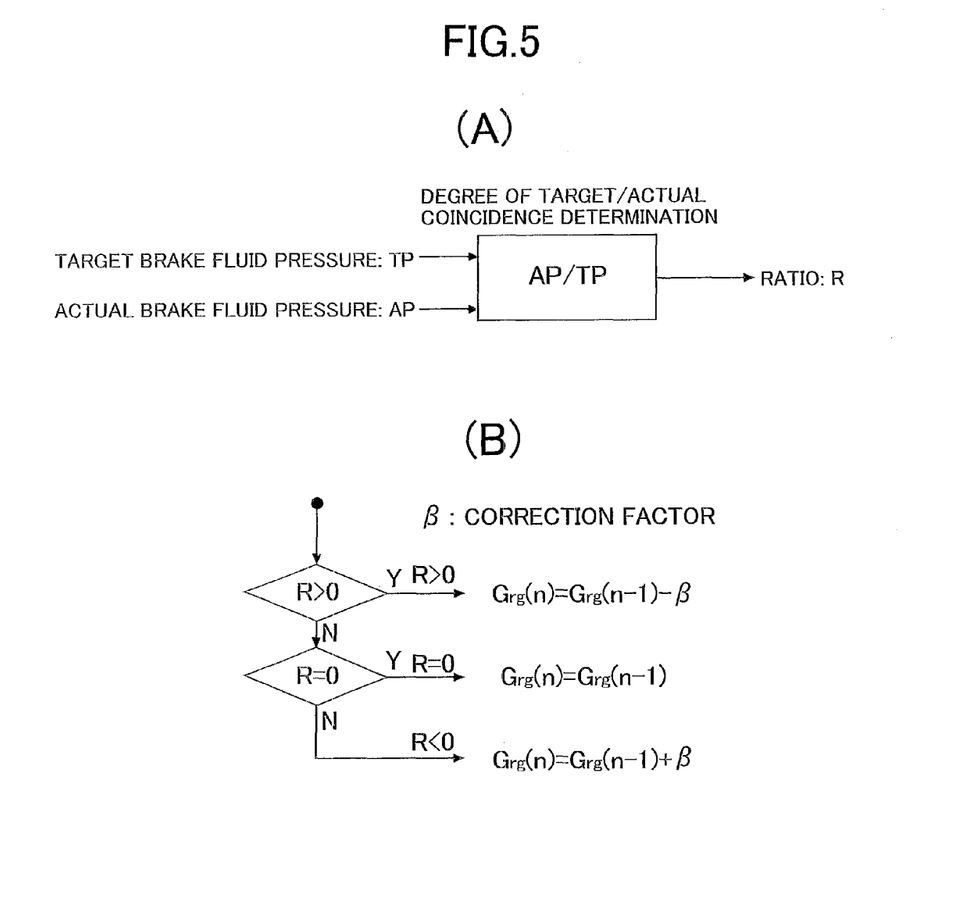
FIG. 5 is a diagram (part 2) for explaining a calculation technique of a correction gain. (first embodiment)

In the above-mentioned method, the correction gain Grg is calculated based on the deviation S between the actual brake fluid pressure AP and the target brake fluid pressure TP (target brake fluid pressure TP—actual brake fluid pressure AP), but in another method the correction gain Grg is calculated based on a ratio R of the actual brake fluid pressure AP and the target brake fluid pressure TP (actual brake fluid pressure AP/target brake fluid pressure TP) (see FIG. 5 (A)).

As shown in FIG. 5 (B), when the ratio R of the actual brake fluid pressure AP and the target brake fluid pressure TP is greater than 1, a current value Grg(n) for the correction gain Grg is calculated by subtracting a correction factor β from a previous value Grg(n−1); when the ratio R of the actual brake fluid pressure AP and the target brake fluid pressure TP is 1, the current value Grg(n) for the correction gain Grg is calculated as the same value as the previous value Grg(n−1); and when the ratio R of the actual brake fluid pressure AP and the target brake fluid pressure TP is smaller than 1, the current value Grg(n) for the correction gain Grg is calculated by adding the correction factor β to the previous value Grg(n−1).

The above-mentioned calculation of correction gain Grg is not possible at all timings, and is carried out at a timing that matches predetermined conditions. That is, it is necessary for it to be carried out in a state in which the driver depresses and holds the brake pedal 12 and a brake fluid pressure generated by the slave cylinder 23 is stable. Holding of the brake pedal 12 after being depressed may be determined from the output of the pedal stroke sensor Sa or the differential value of the target brake fluid pressure. It is necessary to set the time of holding of the brake pedal 12 to be sufficiently longer than the transmission cycle (20 msec) of the actual brake fluid pressure by the CAN M7. This can prevent an inappropriate corrected value from being calculated in a state in which the brake fluid pressure is unstable or a state in which an actual brake fluid pressure signal is not inputted.

Furthermore, since hysteresis is present in the brake system, if a return operation of the brake pedal 12 is carried out even once during one braking operation, calculation of correction gain Grg is not carried out during that braking operation. The reason is that, if a return operation of the brake pedal 12 is carried out even once during one braking operation, due to the influence of hysteresis the relationship between the stroke of the slave cylinder 23 and the actual brake fluid pressure changes.

Furthermore, the correction factor β may be a constant value, but increasing the value for the correction factor β when the coincidence of the actual brake fluid pressure with the target brake fluid pressure is poor can enhance with a small number of times of correction the coincidence of the actual brake fluid pressure with the target brake fluid pressure.

Moreover, incorporating the correction gain Grg into the target stroke for the slave cylinder 23 (multiplying the target stroke for the slave cylinder 23 therewith) is carried out in a state in which the driver is not operating the brake pedal 12. A state in which the driver is not operating the brake pedal 12 can be determined from the output of the pedal stroke sensor Sa or the value of the target brake fluid pressure. Incorporation of the correction gain Grg into the target stroke for the slave cylinder 23 is not carried out during braking in order to prevent an uncomfortable sensation from being given to the driver due to a rapid change of the target motor rotational angle during braking causing a rapid increase or rapid decrease in the braking force.

Figure 6:
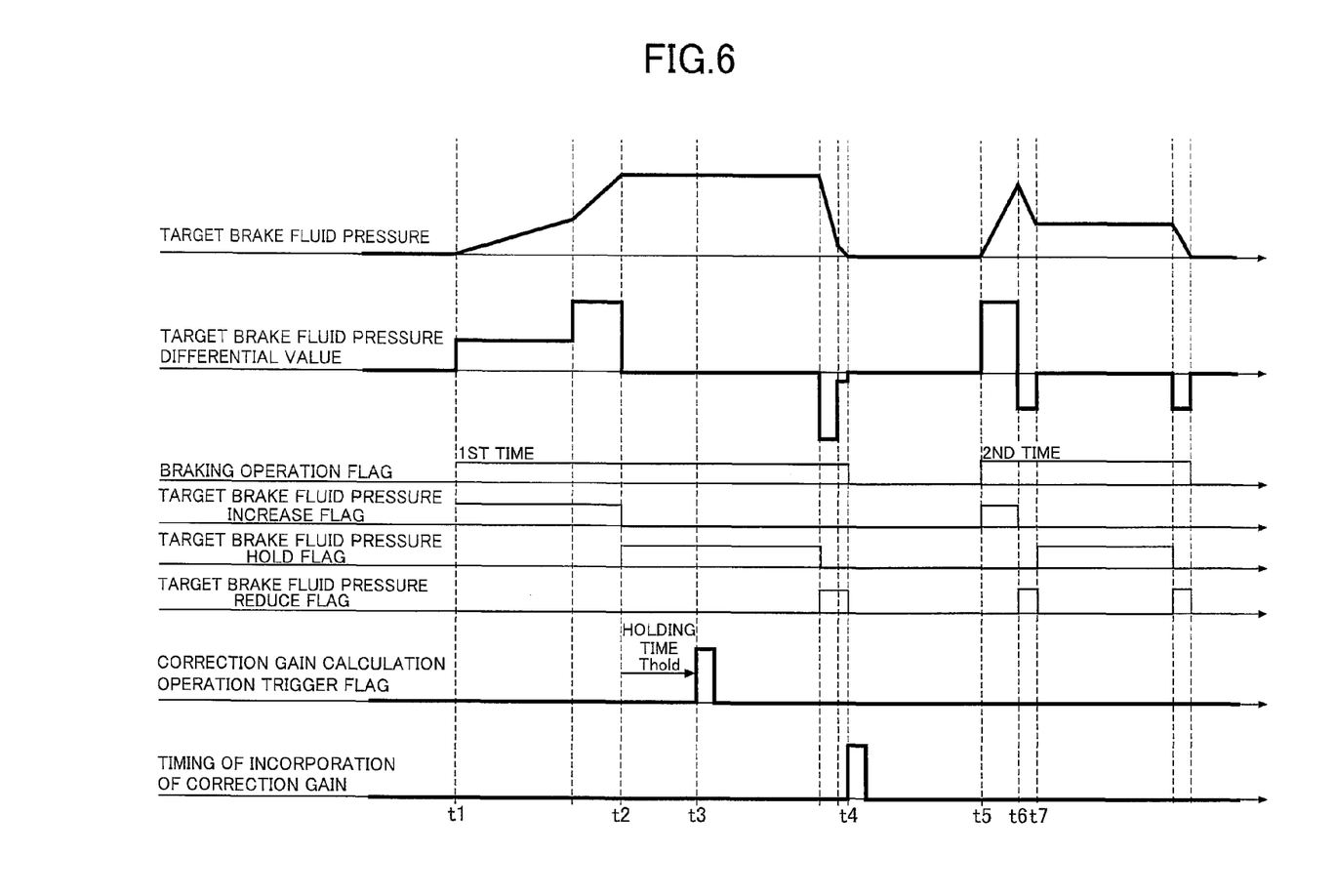
FIG. 6 is a time chart for explaining an example of the operation. (first embodiment)

One example of the above-mentioned operation is now explained by reference to the time chart of FIG. 6.

At time t1 the driver starts to depress the brake pedal 12, at time t2 the driver holds the brake pedal 12 at the depressed position, and when it is confirmed at time t3 that the state has continued for a holding time Thold, calculation of a correction gain Grg is carried out. Following this, when the driver starts to return the brake pedal 12 and completes returning at time t4, incorporation of the correction gain Grg (multiplying the target stroke for the slave cylinder 23 therewith) is carried out.

When at time t5 the driver carries out depression of the brake pedal 12 for a second time, since the brake pedal 12 is returned between time t6 and time t7, calculation and incorporation of the correction gain Grg are not carried out.

Figure 2:
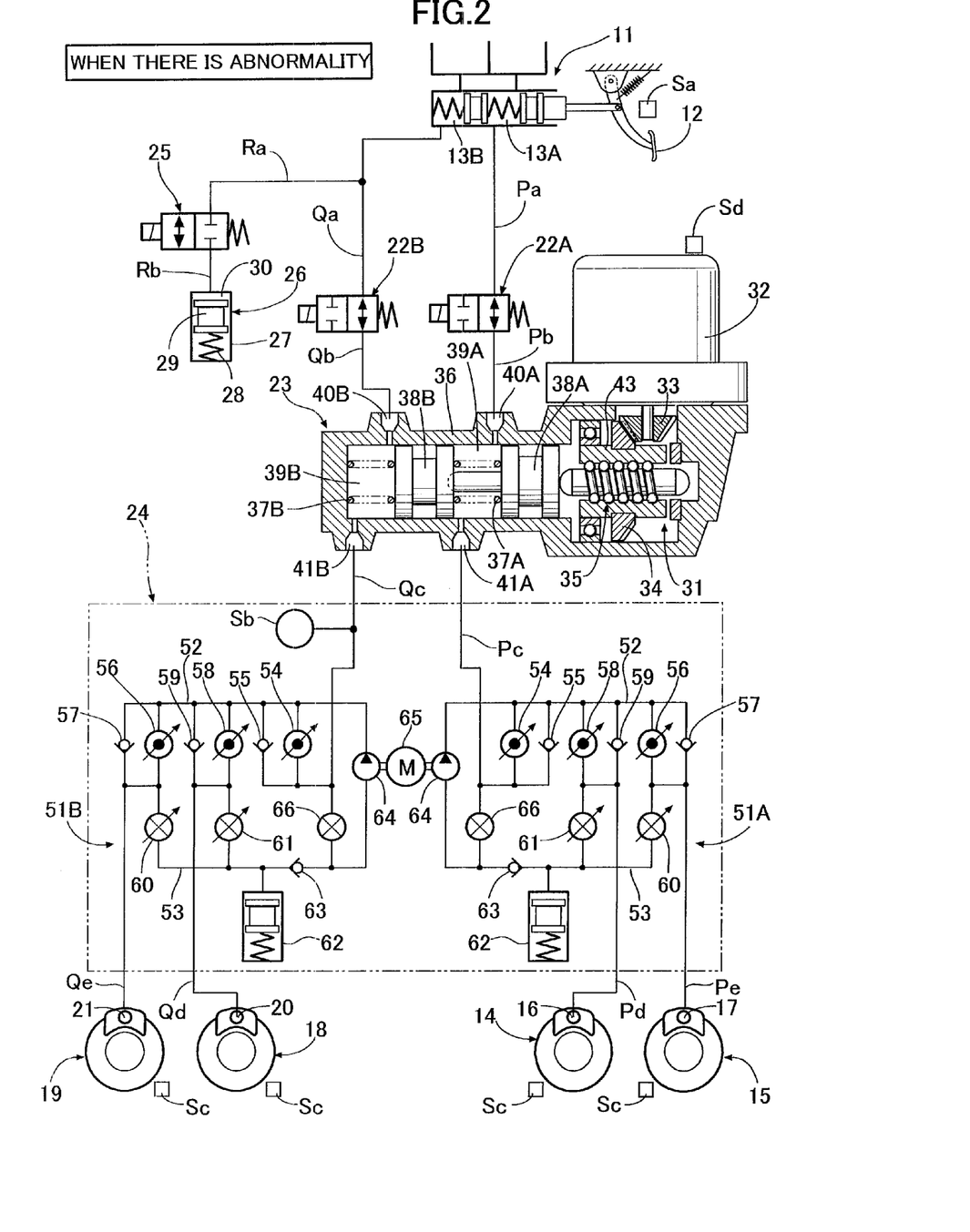
FIG. 2 is a fluid-pressure circuit diagram of a vehicle brake system corresponding to FIG. 1 when the vehicle is operating under abnormal conditions. (first embodiment)

If the slave cylinder 23 becomes inoperable due to power source malfunction, etc., braking is carried out by brake fluid pressure generated by the master cylinder 11 instead of brake fluid pressure generated by the slave cylinder 23.

That is, if the power source malfunctions, as shown in FIG. 2, the cut-off valves 22A and 22B, which are normally open electromagnetic valves, automatically open, and the reaction force allowing valve 25, which is a normally closed electromagnetic valve, automatically closes. In this state, brake fluid pressure generated in the first fluid pressure chambers 13A and 13B of the master cylinder 11 passes, without being absorbed by the stroke simulator 26, through the opened cut-off valves 22A and 22B, the rear and front fluid pressure chambers 39A and 39B of the slave cylinder 23, and the opened regulator valves 61 and 61 and in-valves 42 of the VSA device 24, thus generating a braking force in the wheel cylinders 16 and 17; 20 and 21 of the disk brake devices 14 and 15; 18 and 19 of the wheels without problems.

The operation of the VSA device 24 is now explained.

When the driver depresses the brake pedal 12 in order to carry out braking, the electric motor 65 stops operating, the regulator valves 54 and 54 are de-energized and open, the suction valves 66 and 66 are de-energized and closed, the in-valves 56 and 56; 58 and 58 are de-energized and open, and the out-valves 60 and 60; 61 and 61 are de-energized and closed. Therefore, a brake fluid pressure outputted from the rear and front output ports 41A and 41B of the operating slave cylinder 23 is supplied from the regulator valves 54 and 54 to the wheel cylinders 16 and 17; 20 and 21 via the opened in-valves 56 and 56; 58 and 58, thus braking the four wheels.

When the driver is not depressing the brake pedal 12, driving the pumps 64 and 64 by means of the electric motor 65 in a state in which the suction valves 66 and 66 are energized and opened allows brake fluid that has been sucked from the slave cylinder 23 side via the suction valves 66 and 66 and pressurized by the pumps 64 and 64 to be supplied to the regulator valves 54 and 54 and the in-valves 56 and 56; 58 and 58. Therefore, regulating the degree of opening by energizing the regulator valves 54 and 54 so as to adjust the brake fluid pressure in the fluid paths 52 and 52 and supplying the brake fluid pressure selectively to the wheel cylinders 16 and 17; 20 and 21 via the in-valves 56 and 56; 58 and 58 that are opened at a predetermined degree of opening by energization enables the braking forces for the four wheels to be individually controlled even in a state in which the driver is not depressing the brake pedal 12.

It is therefore possible to individually control the braking forces for the four wheels by means of the first and second brake actuators 51A and 51B, enhance the turning performance by increasing the braking force for the turning inner wheel, and enhance straight-line stability by increasing the braking force for the turning outer wheel.

Furthermore, when the driver rapidly depresses the brake pedal 12 in order to avoid a collision, the brake fluid pressure generated by the slave cylinder 23 is further increased by the pumps 64 and 64, and the increased brake fluid pressure generates the maximum braking force in the wheel cylinders 16 and 17; 20 and 21. That is, if the pumps 64 and 64 are driven by the electric motor 65 in a state in which the regulator valves 54 and 54 are energized and closed and the suction valves 66 and 66 are energized and opened, the brake fluid pressure generated by the slave cylinder 23 is sucked by the pumps 64 and 64 via the suction valves 66 and 66, further pressurized there, and supplied to the wheel cylinders 16 and 17; 20 and 21 via the in-valves 56 and 56; 58 and 58, thus assisting the braking operation by the driver and generating a large braking force for avoiding a collision.

Furthermore, for example, when a tendency for the left front wheel running on a road with a low coefficient of friction to lock is detected based on output of the wheel speed sensors Sc during braking by the driver depressing the brake pedal 12, after the brake fluid pressure of the wheel cylinder 16 for the left front wheel is released to the reservoir 62 so as to reduce it to a predetermined pressure by energizing and closing one in-valve 58 of the first brake actuator 51A and energizing and opening one out-valve 61, the brake fluid pressure of the wheel cylinder 16 for the left front wheel is held by energizing and closing the out-valve 61. If, as a result, the locking tendency of the wheel cylinder 16 for the left front wheel starts to disappear, de-energizing and opening the in-valve 58 allows brake fluid pressure from the rear output port 41A of the slave cylinder 23 to be supplied to the wheel cylinder 16 for the left front wheel so that it increases to a predetermined pressure, thus increasing the braking force.

When this increase in pressure causes the left front wheel to have a locking tendency again, repeating the pressure reducing→holding→pressure increasing enables ABS (Antilock Brake System) control for minimizing the braking distance to be carried out while suppressing locking of the left front wheel.

ABS control when the wheel cylinder 16 for the left front wheel has a tendency to lock is explained above, and ABS control can be carried out in the same manner when the wheel cylinder 17 for the right rear wheel, the wheel cylinder 20 for the right front wheel, or the wheel cylinder 21 for the left rear wheel has a tendency to lock.

While the above-mentioned VSA control is being executed, if the driver is not depressing the brake pedal 12 and the slave cylinder 23 is not being operated, since the VSA device 24 and the master cylinder 11 are in a state in which they are communicating via the slave cylinder 23, energizing and closing the cut-off valves 22A and 22B can prevent a change in fluid pressure due to operation of the VSA device 24 from being transmitted from the master cylinder 11 to the brake pedal 12 as a kickback.

Second Embodiment

Figure 7:
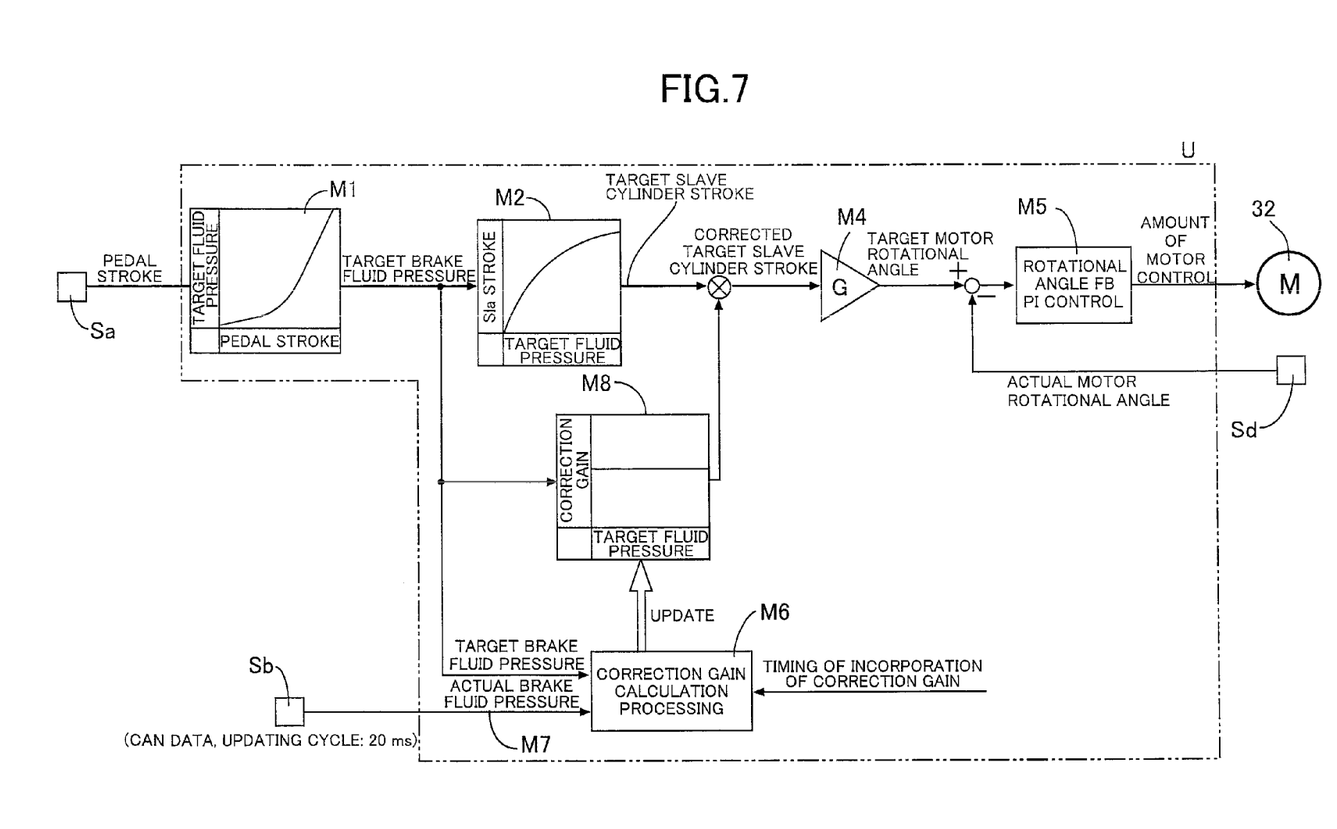
FIG. 7 is a block diagram of a control system of an electric motor. (second embodiment)

A second embodiment of the present invention is now explained by reference to FIG. 7.

In the first embodiment there is only one correction gain Grg, but in the second embodiment target brake fluid pressure-correction gain setting means M8 includes a plurality of gain maps corresponding to the target brake fluid pressure, and setting a correction gain Grg suitable for a target brake fluid pressure at a given time enables the coincidence of an actual brake fluid pressure with the target brake fluid pressure to be enhanced in all target brake fluid pressure regions.

Modes for carrying out the present invention are explained above, but the present invention may be modified in a variety of ways as long as the modifications do not depart from the spirit and scope thereof.

For example, the electric brake fluid pressure generation means of the present invention is not limited to the slave cylinder 23 of the embodiment, and may be one that generates a brake fluid pressure by means of a pump driven by an electric motor.

Furthermore, the driver braking operation state of the present invention is not limited to a pedal stroke of the brake pedal 12 of the embodiment, and may be a depression force for the brake pedal 12.

The invention claimed is:

1. A brake device for a vehicle, comprising:
   electric brake fluid pressure generation means for generating brake fluid pressure by an electric motor;
   actual brake fluid pressure detection means for detecting an actual brake fluid pressure actually generated by the electric brake fluid pressure generation means;
   braking operation state detection means for detecting a driver braking operation state;
   target brake fluid pressure setting means for setting a target brake fluid pressure that is to be generated by the electric brake fluid pressure generation means according to the braking operation state;
   target rotational angle setting means for setting a target rotational angle for the electric motor that corresponds to the target brake fluid pressure;
   actual rotational angle detection means for detecting an actual rotational angle of the electric motor;
   electric motor control means for controlling actuation of the electric motor so as to make the actual rotational angle converge to the target rotational angle;
   communication means for transmitting at predetermined time intervals an actual brake fluid pressure detected by the actual brake fluid pressure detection means; and
   correction means for calculating a corrected value for correcting the target rotational angle for the electric motor based on a difference or a ratio of the target brake fluid pressure and the actual brake fluid pressure that is transmitted by the communication means and making the target rotational angle setting means output the target rotational angle which has been corrected by the corrected value.

2. The brake device for a vehicle according to claim 1, wherein the correction means determines a calculation timing for the corrected value based on the braking operation state detected by the braking operation state detection means or an actual brake fluid pressure signal detected by the actual brake fluid pressure detection means.

3. The brake device for a vehicle according to claim 2, wherein the correction means comprises a gain map corresponding to a target brake fluid pressure and calculates the corrected value based on the target brake fluid pressure and a difference or a ratio of the actual brake fluid pressure and the target brake fluid pressure.

4. The brake device for a vehicle according to claim 1, wherein the correction means cancels calculation of the corrected value when the braking operation state detection means detects a return operation of a brake pedal.

5. The brake device for a vehicle according to claim 3, wherein the correction means comprises a gain map corresponding to a target brake fluid pressure and calculates the corrected value based on the target brake fluid pressure and a difference or a ratio of the actual brake fluid pressure and the target brake fluid pressure.

6. The brake device for a vehicle according to claim 1, wherein the correction means determines the timing of incorporation of the corrected value based on the braking operation state detected by the braking operation state detection means or an actual brake fluid pressure signal detected by the actual brake fluid pressure detection means.

7. The brake device for a vehicle according to claim 4, wherein the correction means comprises a gain map corresponding to a target brake fluid pressure and calculates the corrected value based on the target brake fluid pressure and a difference or a ratio of the actual brake fluid pressure and the target brake fluid pressure.

8. The brake device for a vehicle according to claim 1, wherein the correction means comprises a gain map corresponding to a target brake fluid pressure and calculates the corrected value based on the target brake fluid pressure and a difference or a ratio of the actual brake fluid pressure and the target brake fluid pressure.

* * * * *